Dec. 20, 1938.  C. H. WILMOT  2,140,867

STRAIN RELIEF FOR ELECTRICAL APPLIANCE CORDS

Filed June 25, 1937

INVENTOR
Charles H. Wilmot
BY
A. D. T. Libby
ATTORNEY

Patented Dec. 20, 1938

2,140,867

UNITED STATES PATENT OFFICE 2,140,867

STRAIN RELIEF FOR ELECTRICAL APPLIANCE CORDS

Charles H. Wilmot, Hillside, N. J., assignor to Hatfield Wire & Cable Company, Hillside, N. J.

Application June 25, 1937, Serial No. 150,243

4 Claims. (Cl. 173—322)

This invention relates to means for relieving the strain on the conductors of an electrical cord or cable used with appliances such as flat irons.

In the construction of a plug for an electrical appliance, such as a flat iron, the conductors of the cord pass through an annular recess formed by the two parts of the plug when assembled. The conductors of the cord are split and usually pass in opposite directions around the edges of a partition moulded integrally with the two parts of the plug, and are then connected to the contact members carried by the plug. While the ends of this partition, which are engaged by the bends in the conductors, take part of the strain away from the conductors at the point where they are attached to the contact members, considerable strain is still carried to the attachment means usually in the form of a screw threaded into each of the contact members.

It has recently been proposed by the Underwriters Laboratories that the cord of an appliance set, such as for a flat iron, shall be capable of withstanding, for a period of one minute, a straight pull of fifty pounds between the cord and the plug, with the conductors entirely disconnected from the contact members. Furthermore, it has been proposed that the cord shall be capable of withstanding, for the period of one minute, a torque of three inch pounds between the cord and the plug.

It is therefore the principal object of my invention to provide a strain-relief for the cord which will meet the foregoing requirements.

A further object of my invention is to provide a strain-relief means which not only meets the foregoing requirements, but which will meet the requirements with a large factor of safety, and which may be applied to present plugs without any changes therein.

Another object of my invention is to provide a simple and cheap strain-relief means which will meet the said requirements and at the same time provide a plug structure which will speed up the assembly operations as well as make a saving in the cost of the plug parts, and a considerable saving in the length of the cord required.

These and other objects will be clear to one skilled in this art, after reading the attached specification, taken in connection with the annexed drawing, wherein.

Figure 1:
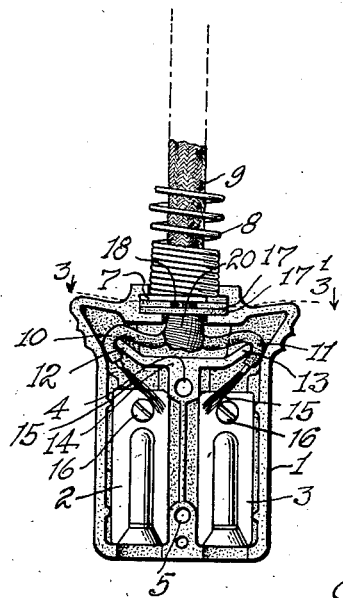
Figure 1 is a plan view of one-half of a plug member such as now in use and to which my strain-relief means has been applied, the conductors being shown in the manner in which the strain test is to be carried out.

In the various views, wherein like numbers refer to corresponding parts, 1 illustrates one-half of a flat iron plug, it being understood that the halves of the two parts of the plug are recessed to provide seats for the female contact terminals 2 and 3, the two halves of the plug being fastened together by screws going through the holes 4 and 5. Each of the plug parts is provided with a half annular recess 6, within which it has been the usual practice to seat the closely formed and enlarged spirally arranged end 7 of a protecting spring 8, a portion only of which is shown surrounding the cable 9.

As shown in Figure 1, the conductors 10 and 11, coming out of the cord 9 after it passes through the recess 6, are bent around the ends 12 and 13 of a partition or ledge 14 moulded integrally with the two halves 1 of the plug. The ends of the conductors 10 and 11 are bared as indicated at 15 for wrapping under the head of the screw 16.

A sharp bend of the conductors around the ends 12 and 13 of the partition 14 acts to take some of the strain away from the ends 15 of the conductors at the screw fastening means 16, but the proposed requirement, to which reference has been made, makes it necessary that all strain be removed from the conductors at this fastening point. To accomplish this, I have provided a strain-relief device 17 having a notch 18 which preferably extends to a point near the central axis thereof. The member 17 is preferably made of strong, bendable insulating material such as fiber. The notch 18 is of a width to normally fit very snugly over the cable 9 which is shown in dotted line in Figure 5, the diameter being shown as a circle, although most cords are not completely round, and the notch 18 is smaller than the circle 9 shown in Figure 5, so that it will fit snugly over the cord on its smallest diameter.

Figure 4:
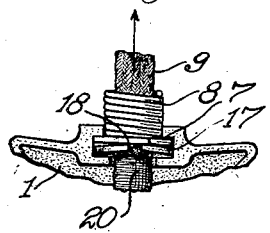
Figure 4 is a sectional view through one end of the plug showing only one of the strain-relief devices in place.
Figure 5:
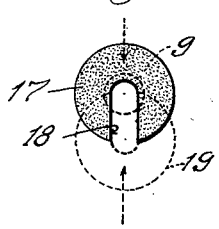
Figure 5 is a diagrammatic view showing a preferred form of assembling the strain-relief means shown in Figures 1 and 3.
Figure 3:
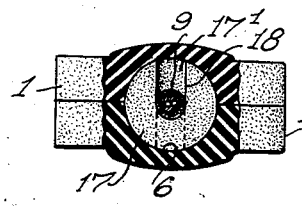
Figure 3 is a view on the line 3—3 of Figure 1, but with both halves of the plug being shown.
Figure 6:
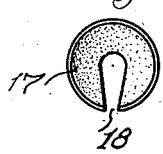
Figure 6 is a plan view of a strain-relief device in the position which it will take when subjected to a heavy strain.
Figure 7:
Figure 7 is a side view of the device shown in Figure 6, the view being turned ninety degrees.

In Figure 1, I have shown two strain-relief devices 17 and 17' slipped over the cable 9 in opposite direction as indicated in Figure 5, wherein the dotted line 19 indicates the position of one of the strain-members before it is pushed in place over the cable in reverse direction to its cooperating mate. As indicated in Figure 1, the thickness of the disc 17 is such that with the convolutions 7 of the spring 8, these parts are wedged in the standard annular recess 6. A pull on the cord 9 away from the plug acts to bend the member 17 curvilinearly, as shown in Figure 4, to cause the slot 18 to close somewhat as shown in Figures 6 and 7. This action causes the strain-relief devices or discs 17 to grip into the cord 9 and prevent the strain from being transmitted to the bared ends 15 of the conductors at the screw attachment points 16. This strain-relief means is particularly effective where the cord is wrapped or wound at 20 with thread or tape which has also been proposed as a new requirement to prevent the outer braid from unravelling.

From the tests I have made, I have found that one of the strain-relief devices 17, of suitable thickness and material, will more than meet the required strain tests, but to better meet the torque test, I prefer the arrangement shown in Figure 1, wherein the plurality of discs are wedged into the annular recess 6 along with the end 7 of the protective spring. Where no protective spring is used, the strain devices themselves are wedged into said recess.

Figure 2:
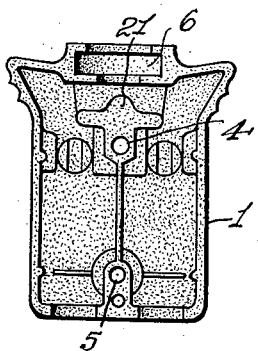
Figure 2 is a plan view of one-half of a simplified form of plug which may be used with my improved strain-relief means.

I have further found, by the use of the strain-relief means described, that the plug parts 1 may be simplified by removing the projecting ends 12 and 13 of the partition 14 as indicated in Figure 2, from which it will be seen that the conductors 10 and 11 will readily pass around the divider 21 and may be quickly assembled to the contact members 2 and 3, thereby materially speeding up the assembly operation. The construction of Figure 2 also simplifies the mould, and therefore reduces the cost of producing the plug parts.

It will also be readily seen, with reference to Figures 1 and 2, that the length of the cord required in the construction of Figure 2 is considerably less, and from tests I have made, this saving is one inch to each cord, which is a material saving when it is considered that upwards to 100,000,000 cord sets are made each year in the United States.

It will thus be seen that I have provided a cheap and inexpensive cord strain-relief device which meets all the requirements and objects heretofore stated.

What I claim is:

1. In the combination of an appliance cord and plug having interiorly disposed contacts and an annular recess at the cord end in which one end of a protecting spring member is normally positioned; means for taking the strain from the conductors of the cord at said contacts, said means including at least one disc of strong insulating material having a notch extending from the periphery to a point near the center of the disc, which point is in substantially straight alignment with the axis of the cord, the notch being of a width to normally fit snugly over the cord within said annular recess and adjacent the end of said spring, said disc being bendable so as to tend to close the notch to grip the cord when strain is applied thereto.

2. In the combination of an appliance cord and plug having interiorly disposed contacts and an annular recess at the cord end in which one end of a protecting spring member is normally positioned; means for taking the strain from the conductors of the cord at said contacts, said means including a plurality of notched discs of strong insulating material snugly fitting over the cord in said recess adjacent said spring end, the notches extending so as to include the center of the disc, the discs being pushed over the cord by way of said notches in angular displaced relation one to the other, said discs being bendable to cause the notch in each to close into firmer gripping relation to the cord when tension is applied thereto.

3. An electrical appliance cord set comprising a plug having internal contact members and an annular recess and a cord passing through said recess, and having a plurality of conductors to engage said contact members, a disc of tough insulating material having a notch therein extending to the center of the disc and located in said recess and wedged therein in a direction lengthwise of the cord for initially gripping the cord and capable of increasing its grip when tension is applied between the cord and plug, said disc being in axial frictional engagement with at least portions of the wall of the recess to resist torque strain between the plug and cord.

4. An electrical appliance cord set comprising a plug having internal contact members and an annular recess with the end of a cable-protecting spring located in said seat and a cord passing through said recess and having a plurality of conductors to engage said contact members, strain means including at least one disc of tough insulating material having a notch therein extending to the center of the disc, said disc being located in said recess adjacent the end of said spring and wedged between it and the wall of the recess for initially gripping the cord and capable of increasing its grip when strains are applied between the cord and plug.

CHARLES H. WILMOT.